United States Patent [19]

Seigneur et al.

[11] Patent Number: 5,093,998

[45] Date of Patent: Mar. 10, 1992

[54] REPAIRABLE GUIDE BAR FOR TREE HARVESTERS

[75] Inventors: Christopher D. Seigneur, West Linn, Oreg.; Gerald A. Locker, Vancouver, Wash.

[73] Assignee: Blount, Inc., Portland, Oreg.

[21] Appl. No.: 757,547

[22] Filed: Sep. 11, 1991

Related U.S. Application Data

[63] Continuation-in-part of Ser. No. 604,613, Oct. 26, 1990, Pat. No. 5,052,109.

[51] Int. Cl.⁵ .............................................. B23D 57/02
[52] U.S. Cl. ............................................ 30/387; 30/383
[58] Field of Search ......................................... 30/383–387; 144/34 R

[56] References Cited

U.S. PATENT DOCUMENTS 3,529,971 8/1974 Anderson ............................ 30/383

Primary Examiner—Douglas D. Watts
Attorney, Agent, or Firm—Robert L. Harrington

[57] ABSTRACT

A guide bar for a mechanical harvester wherein the guide bar is repairable after bending. The guide bar is provided with a bendable section in a limited zone between the mounting bracket and the principal cutting portion of the bar. A hinge area is thereby created in the zone area to permit bending of the bar without breaking. The rails are removed within this hinge area. The saw chain traverses the short railless section during normal cutting action. Upon bending of the bar, the chain assumes its own curvature in traversing the section and will more readily jump the bar when bending forces are so severe as to likely break the chain.

5 Claims, 3 Drawing Sheets

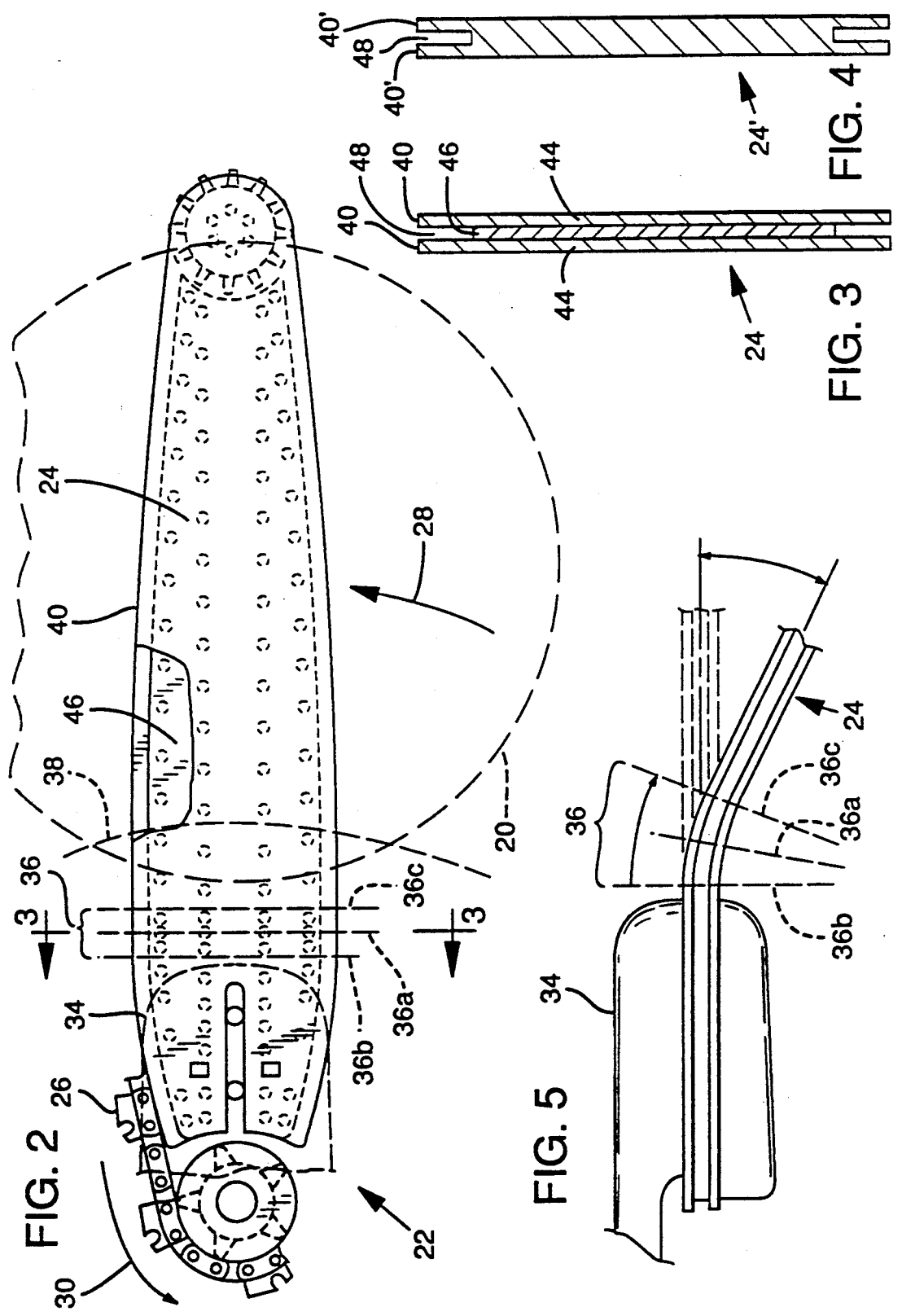

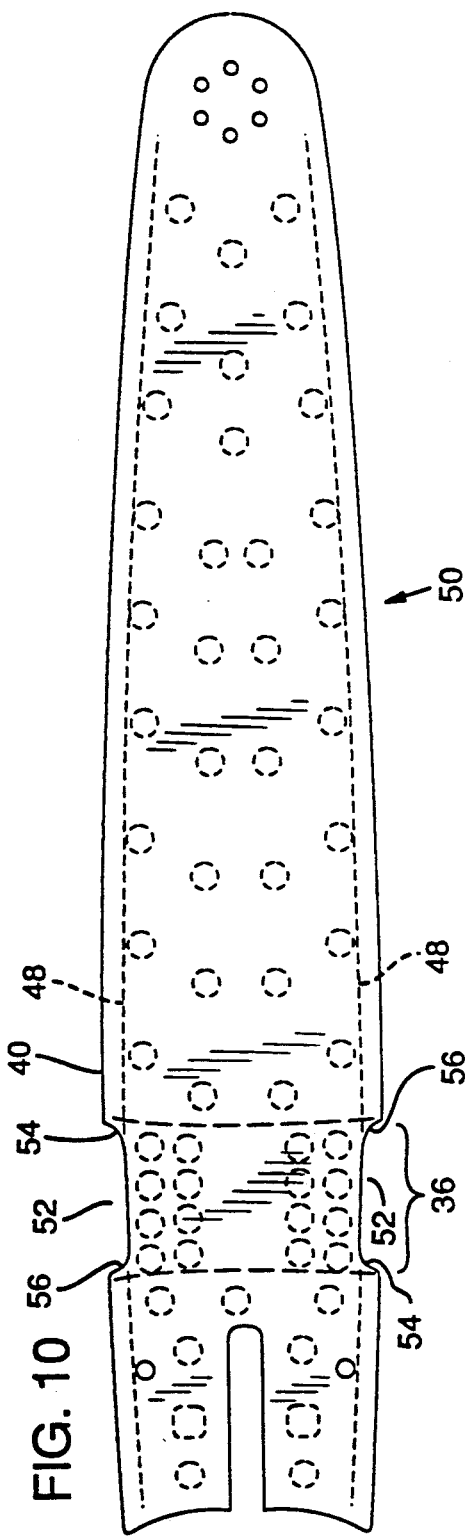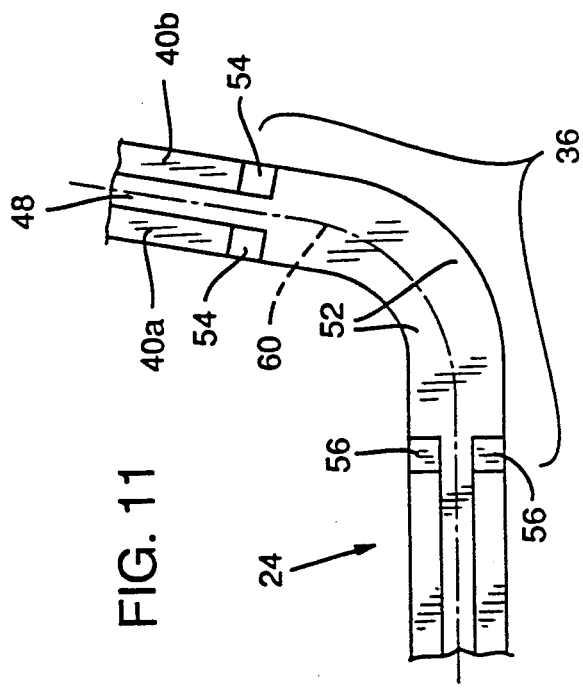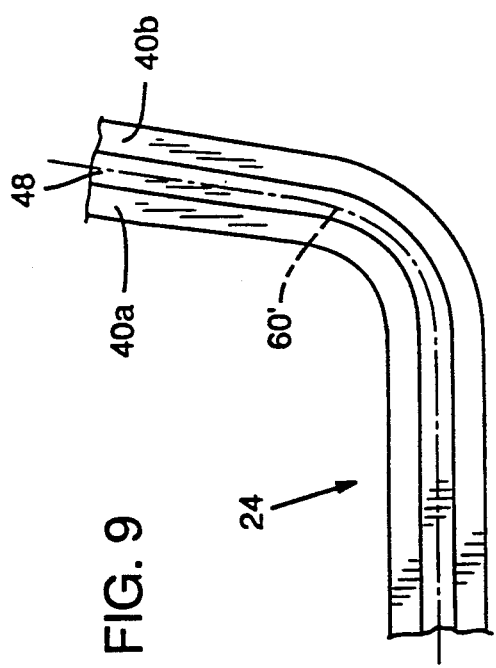

REPAIRABLE GUIDE BAR FOR TREE HARVESTERS

This is a continuation in part of application Ser. No. 7/604,613 filed Oct. 26, 1990 of James L. Vanderzanden and Christopher D. Seigneur for REPAIRABLE GUIDE BAR FOR TREE HARVESTERS, now U.S. Pat. No. 5,052,109.

FIELD OF THE INVENTION

This invention relates to guide bars for saw chain used on mechanical tree harvesters and more particularly to a guide bar that is designed to suffer deformation and is repairable for additional service.

BACKGROUND OF THE INVENTION

Mechanical tree harvesters are used for logging trees. They typically consist of a tractor equipped with a boom. A grapple on the end of the boom grips a standing tree. A chain saw located below the grapple and controlled by the operator from the cab of the tractor, severs the tree. The operator maneuvers the boom and grapple to lay the severed tree on the ground and the process is repeated.

The guide bar is mounted on a pivot and the operator initially pivots the bar and chain to a protected position inside a channel of a rigid guard. With the tree held by the grapple, the guide bar and driven saw chain are pivoted out of the guard and through the base of the tree. In the process, the unguarded bar and chain will typically cut through the tree without incident and be returned to the protected position inside the guard prior to the operator maneuvering of the severed tree onto the ground.

The above refers to the normal operation. Not infrequently due to various circumstances that are encountered, the bar and chain are subject to damage. This may occur for example when trees are grouped too close together. A bar and chain will cut through the tree held by the grapple and begin cutting into a closely adjacent tree before the tree held by the grapple is completely severed. When the tree held by the grapple has been severed, the boom will instantly lift the tree. With the bar and chain embedded in the adjacent tree, this movement translates into a bending force applied to the bar. Something has to give which often results in the bar being bent and damaged.

In some cases, the tree trunk is so misshapen that the grapple will not firmly grip the tree. If the grapple loses its grip on the tree during the cutting operation, the tree will slide down against the bar and the bar will be damaged. Operator error is a further possibility. A lifting force is applied to prevent the kerf from collapsing and binding the chain. Too much lifting force applied during the cutting operation can cause the grapple to slide up the tree trunk and again a severe bending force is applied to the bar.

Other examples could be given but the common result of all these occurrences is that the bar becomes bent and most likely damaged. Bending occurs most frequently adjacent the juncture of the mounting bracket at the inner end of the bar. The bend is most often a sharp bend which invariably cracks the bar and renders it non-repairable. Such breakage of the guide bar is a major concern and expense to the mechanical tree harvesting operation and alleviating the problem is an object of the present invention.

BRIEF SUMMARY OF THE INVENTION

A guide bar for a chain saw and particularly as mounted on a tree harvester, is subjected to severe forces that induce rapid wearing. If the guide bar is to have an acceptable life, it must be structured with the optimum of wear resistant capability. With technology as presently known, such wear resistance is only provided by very hard metals and very hard metals do not readily bend. They resist bending until that resistance is overpowered and then they break. Conversely, metal can be made to bend but the very property that permits bending is the property that reduces wear resistance.

In a typical guide bar, the body of the bar has one level of hardness and the surrounding edge is hardened further (e.g. by heat treating) to form the guide rails on which the saw chain is entrained. The saw chain being pressed against the rails during the forced cutting operation creates extremely high temperatures and pressures which have to be resisted by hardened surfaces if the bar it to have an effective lift. These rail areas will not bend readily and if they crack, the bar becomes useless.

The invention herein is based on the recognition that the area where bending forces are typically applied during the non-typical occurrences of forced deformation of the bar, i.e., at the rear end adjacent the mounting bracket, is also an area that is not typically involved in the cutting action. A bar is not normally buried in the cut to the mounting bracket and even when it is, the cutting action is restricted to a small segment of the tree's total cross section. The greatest cutting action and highest wear problem occurs at the bar center where the chain has to cut through the total tree thickness.

The inventive solution to the problem is thus the provision of a small band of the bar adjacent the mounting bracket that is designated as a zone of bending. This zone of the bar is modified to permit bending at the sacrifice of reduced support for the saw chain as it traverses the zone. However, the band has a short length and is strategically placed in that position where the need for chain support is the lowest and the application of the bending forces is the highest.

The modification to the bar involves the removal of the bar rails which define the guide bar groove within the designated bending zone. In the preferred embodiment the rails will be totally removed and the total bar thickness below the groove will be slightly removed as well. The saw chain, which resists lateral bending on its own, is guided in the chain bar groove both prior to and following the zone of bending and traverses the railless segment during normal operation without any support from the bar groove, either from the sides or bottom. The advantage over the guide bar having a softenend zone of bending is that the saw chain within the bend zone is free to follow its own path of curvature in traversing the bend rather than that dictated by the bent bar rail. The bar rails may be forced into a tight bend and/or the bar rails may be pinched, and in either case, the chain can be damaged. Also, if the bar is severely bent, i.e., to the point where the chain cannot form the tight curve required to follow the bend, the railless segment will permit the chain to jump the rail and thereby avoid chain damage. The relieved groove bottom wall (through removal of the bar thickness) insures that the depending drive tangs of the saw chain do not hammer against the groove bottom.

Because bending is allowed to occur at the railless segment without effecting the preceding and following chain guiding rail segments, the bar can be easily straightened and put back into service.

The invention and its advantages will be more fully understood and appreciated with reference to the following detail description including the drawings which are referred to therein.

BRIEF DESCRIPTION OF THE DRAWINGS

FIG. 2 is a plan view of the bar and chain applicable for use on the tree harvester of FIG. 1;

FIG. 3 is a section view as taken on section lines 3—3 of FIG. 2;

FIG. 4 is a view similar to FIG. 3 of an alternate bar of the invention;

FIG. 5 illustrates the guide bar having been subjected to a bending force;

FIG. 9 is an enlarged partial view of a bend in the bars of FIGS. 3 and 4;

FIG. 10 is a plan view of a guide bar of the invention herein applicable for use on the tree harvester of FIG. 1; and FIG. 11 is an enlarged partial view of a bend in the bar of FIG. 10.

DETAILED DESCRIPTION

Figure 1:
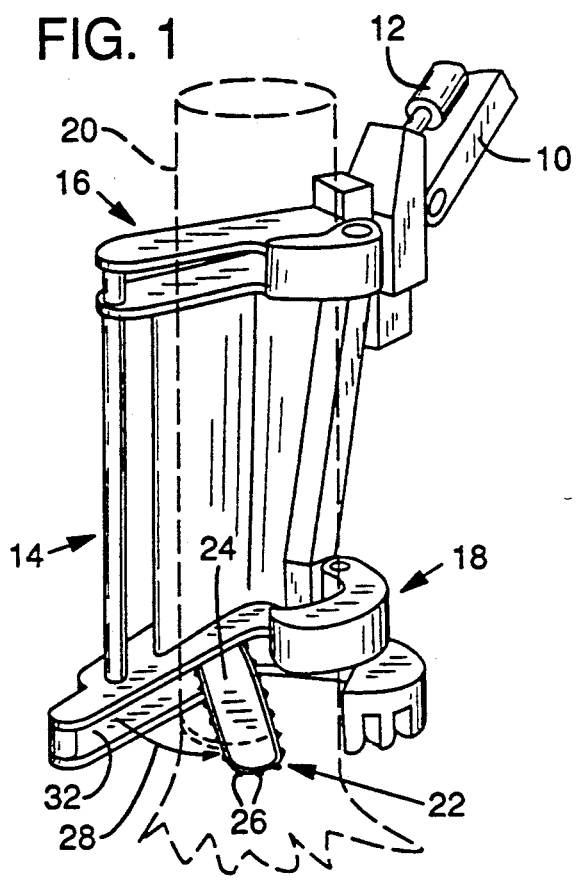
FIG. 1 illustrates the boom end portion of a tree harvester engaged in a cutting operation.

With reference to FIG. 1, illustrated is the end of a boom 10 which is typically mounted to a tractor or the like that is not illustrated. An operator on the tractor operates controls that produce the movement of the boom 10 and the various other components involved in the harvesting operation. For example hydraulic cylinder 12 functions to tilt the mast 14 relative to the boom.

As is typical in a mechanical harvester cutting operation, the mast 14 includes upper and lower grapples 16, 18, respectively. The grapples 16, 18 are closed on a tree 20 to secure the mast 14 to the tree. With the mast 14 thus secure, an appropriate lifting force is applied to the mast 14. A chain saw component 22 carried by the mast 14 is activated to pivot the bar 24 and driven chain 26 (the pivoting movement indicated by arrow 28 and the chain drive movement indicated by arrow 30 in FIG. 2) out of its guard channel 32 and through the tree thickness. The lifting force applied to the mast prevents the tree from collapsing on the saw chain.

Reference is now made to FIG. 2 wherein the chain saw components 22 are illustrated in full line except for the mounting bracket 34 shown in dash lines. (The bracket 34 is more clearly illustrated in FIG. 5.) The tree 20 is superimposed in dash lines over the bar 24 in the approximate position as illustrated in FIG. 1. It is to be particularly noted that a zone 36 between the tree 20 and bracket 34 is available for cutting but does not normally participate in the cutting action, i.e., it is located behind or inward from the tree. However, even when zone 36 is involved in the cutting action, the participation is minimal. Assume the tree 20 being shifted rearward to the edge of bracket 34 and it will be appreciated that zone 36 of the bar would only pass through a small segment 38 of the tree. These factors coupled together indicate the relatively small cutting action that takes place in the zone 36 of the bar. Without the forces of cutting applied to the chain within zone 36, the support provided by the bar rails in that limited segment are not a primary requirement and through experimentation, it has been determined that this segment of the bar rails can be eliminated.

Much of the disclosure of the parent application is applicable herein and that disclosure is incorporated by reference. The disclosure is in part repeated herebelow for convenience.

From the Prior Disclosure

From FIG. 2, it should be appreciated that zone 36 is intended to illustrate a section of the bar that is extended about three inches along the bar length starting from about one-half inch from the edge of bracket 34. The bar as illustrated in FIGS. 2 and 3 is a laminate bar. The bar body is produced initially to a hardness in a range of 35–44, and preferably of about 37 Rockwell C. The bar rail 40 is heat treated to a hardness in a range of 55–61, and preferably of about 57 Rockwell C.

Figure 8:
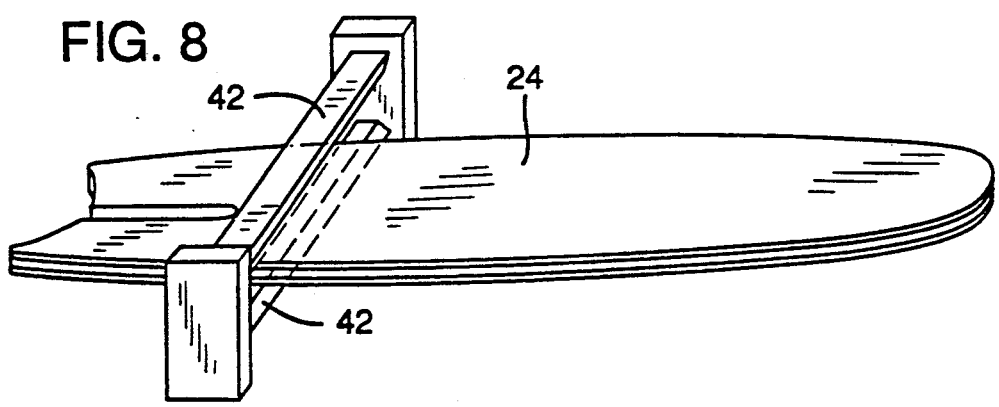
FIG. 8 schematically illustrates a process for producing the reduced hardness zone of either of the alternate versions of FIGS. 3 and 4.

Referring to FIG. 8, the structure is then subjected to a further heat treatment in the zone 36 as indicated by the provision of heating bars 42 that bracket the zone as illustrated. The heat treatment applied reduces the hardness across the entire width of the bar within the bracketed area including the bar rails 42. However, the hardness is not reduced by this method to achieve a constant hardness over the entire area of the zone 36 front to back. The center 36a of zone 36 is reduced to a range of 20–30, and preferably about 25 Rockwell C and the hardness of zone 36 increases to the mentioned 37 and 57 Rockwell C hardness (the body and rail portions, respectively) at the front and rear edges 36b, 36c of the zone 36.

The axis of the bend is at or near the center 36a of the zone 36 and is well forward of the front edge of bracket 34. Manufacturing processes that provide a sharper change from hard to soft will require a shorter zone and will preferably be centered on the bend axis indicated for zone 36, e.g. about two inches from the bracket 34.

Figure 6:
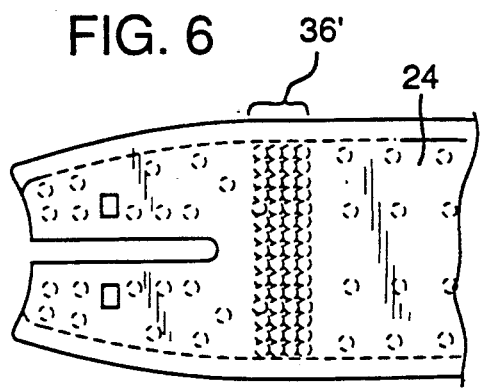
FIGS. 6 and 7 illustrate various construction techniques for constructing the bar of FIG. 3.
Figure 7:
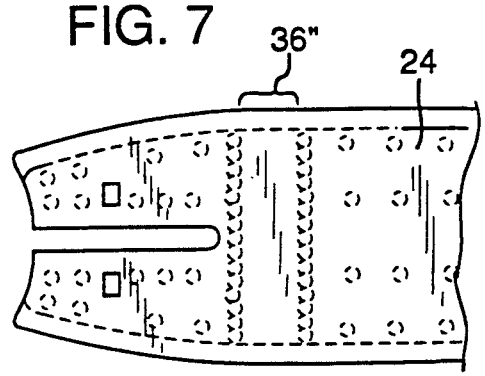

The illustrated preferred guide bar is laminated as previously indicated. The laminated bar does create one further problem. Upon bending the layers of the laminate separate or bulge apart. The metal stretches and even though the bend can be straightened, the stretching renders it difficult or impossible to recapture the original shape. Thus, to cure this, the laminate sections are effectively fused together at the zone 36. FIG. 6 illustrates a zone 36' that is spot welded but wherein the spot welds are grouped close together. FIG. 7 illustrates a zone 36', wherein a process referred to as roller welding achieves an almost total fusion of the laminate layers or sections.

FIG. 3 is of course the laminate bar which is referred to throughout. The two side laminates 44 are separated by a core laminate 46. The core laminate has a reduced configuration relative to the side laminates 44 so as to provide the groove 48 which in turn defines the rails 40 which support the side links of the saw chain.

FIG. 4 represents a solid bar 24' that has a thickness equal to the combined laminates 46 and 44 (both sides). The groove 48' is machined into the edge and forms the side rails 40'.

In either of the above structures of FIGS. 3 and 4, the chain supporting edge of the rails 40' 40' are hardened by an appropriate heat treating process or by application of a thin layer of stellite.

In operation, the harvesting process as explained for FIG. 1 can go awry for any one of a number of reasons. The mast 40 inadvertently shifts upward relative to the tree being severed or in some cases is dropped down onto the tree stump. In one case the bar is bent down as illustrated in FIG. 5 and in the other it is bent up. However, in all material respects, there is no difference between those situations where the bar is bent up or bent down.

As will be noted, the bending action occurs all within the zone 36 and around the center line 36a. Since the material throughout the bar thickness simulates a solid metal plate that has been softened to permit bending, the bend is a smooth bend with minimal deformation. To repair the bar, it is simply forced back to its straight condition which can be accomplished with basic tools that can be carried in the field. In any event, it can be straightened in the shop and returned to service at a substantial savings over the prior practice of simply disposing of the bar. That is because in prior bars the bending that occurs in the zone 36 would invariably generate cracks in the bar body and/or rails 40 and any such cracking would render the bar unusable.

The Present Disclosure

Refer now to FIG. 9 of the figures which illustrates a more severe bend in a bar 24 as compared to that of FIG. 5. It has been found that as a bend occurs in a laminated bar 24 the rails 40a and 40b of the bar do not bend uniformly with respect to each other or the side laminates from which they extend. As a result the width of the guide groove 48 of the bar is narrowed (i.e., the distance between the rails 40a and 40b decreases). As can be appreciated, in the zone of the bend, rail 40a is subject to compression and rail 40b is subject to stretching. The guide groove 48 is thus narrowed and will pinch the depending tang of the drive link received in the groove. The chain is either prevented from travel through the groove or the resulting friction significantly reduces the life of the chain and/or its cutting efficiency.

Saw chain by design flexes through a wide angular range in the plane of the blade but through only a few degrees in the lateral direction. When the prior bar with softened rails is severely bent as in FIG. 9, the chain is prevented from exiting the guide groove and as a result will likely break or be damaged to an extent requiring repair or replacement of the chain. Also, upon repair of such a severely bent bar, straightening the guide rails 40a and 40b at the bend area to conform to the side laminates and to reestablish the desired width of the guide groove 48, is difficult to achieve.

Refer now to FIG. 10 of the drawings. Illustrated is a guide bar 50 having the guide rails 40 (i.e., 40a and 40b) substantially removed in zone 36, i.e., where a bend is most likely to occur. As shown in the preferred embodiment, the rails 40 are basically removed slightly below the base of the guide groove 48 at both the top and bottom of the bar (as viewed in the figure) to form valleys 52 with a ramp 54 provided at the entry end and a ramp 56 provided at the exit end of each valley 52. (These ramps are reversed when the bar is inverted.) The ramps 54 and 56 are provided to assist the smooth transition of the chain from and back onto the guide rails. The relief at the bottom or base of the groove is to avoid hammering by the drive tang. Obviously different bar designs (e.g., having extra deep grooves) will not require this added removal and may even permit some of the rails to show if they do not interfere with the chain travel. Reference to said removal of the rail encompasses these slight variations.

When a bend occurs in bar 50, the rails 40 are not affected since the bending is within the zone 36 wherein the rails are deleted. The absence of rails 40 in the zone 36 avoids the rail straightening problem of the prior embodiment.

FIG. 11 illustrates the bar of FIG. 10 having the same bending damage as illustrated in FIG. 9. Note the permitted path travel of the saw chain indicated by line 60 in FIG. 11 whereas path 60' for the saw chain of FIG. 9 is dictated by groove 48 as defined by guide rails 40a and 40b. Not only is the bend of saw chain path 60 a more gradual bend in FIG. 11, but the lateral bending force is assumed by a greater length of saw chain and thus is shared by more of the saw chain links. In such a severe bend as illustrated in FIGS. 9 and 11, the saw chain is more likely to jump off the side bar in FIG. 11 but that is considered an advantage as compared to the likely damage to the saw chain when forced around the tight curve of FIG. 9.

Others skilled in the art will conceive of various modifications to the illustrated design. Obviously the positioning, length and metal hardness of the bar in the bend zone can vary as may be determined by circumstances, e.g., size of the trees being cut. Also, the invention applies to either laminated bars or solid bars. Accordingly, the invention is not limited to the specific embodiments disclosed, but instead encompasses all variations as defined by the claims appended hereto.

We claim:

1. A chain saw guide bar for a mechanical tree harvester comprising:

a planar elongated bar having a length and width and defining an inner end having an inner end portion for mounting to a support structure of a mechanical harvester, an outer end and a pair of opposed edges extending between said inner and outer ends, said opposed edges configured to have guide rails defining a guide groove for guiding a driven saw chain from said inner end along one edge to the outer end to be guided around said outer end and back to the inner end along said other edge, a zone designated in said bar extending across the width of the bar from edge to edge, said guide rails inside said zone being removed whereby the saw chain exits the guide groove upon entering said zone, spans the zone unguided by said guide groove and reenters the guide groove upon exiting said zone, and said zone positioned adjacent to and outward of said inner end portion and extending a limited distance relative to the bar length whereby the majority of cutting occurs along said edges between said designated zone and the outer end thereof.

2. A chain saw guide bar as defined in claim 1 wherein said guide rails are configured into guide ramps as the entry and exit to said zone.

3. A chain saw guide bar for a mechanical tree harvester comprising;

a planar elongated bar having a length and width and defining an inner end having an inner end portion for mounting to a support structure of a mechanical harvester, an outer end and a pair of opposed edges extending between said inner and outer ends, said opposed edges having guide rails, and a guide groove for guiding a driven saw chain from said inner end along one edge to the outer end to be guided around said outer end and back to the inner end along said other edge, a zone designated in said bar extending across the width of the bar from edge to edge, said guide rails inside said zone being removed and said zone positioned outward of said inner end portion and extending a limited distance relative to the bar length and said saw chain exiting said guide groove upon entering said zone and re-entering said guide groove upon exiting said zone.

4. A chain saw guide bar as defined in claim 3 wherein the guide bar is constructed of steel and wherein the steel within the designated zone is processed to be softer than the steel of the bar outside said designated zone.

5. A chain saw guide bar as defined in claim 3 wherein the guide bar within said zone is removed slightly below the depth of the guide groove to insure non-interference with the saw chain when traversing said zone.

* * * * *